(12) United States Patent
Weinman, Jr.

(10) Patent No.: US 6,339,838 B1
(45) Date of Patent: Jan. 15, 2002

(54) CONTROL OF COMMERCIAL PROCESSES

(75) Inventor: Joseph Bernard Weinman, Jr., Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/002,360

(22) Filed: Jan. 2, 1998

(51) Int. Cl.[7] .............................................. G06F 4/45
(52) U.S. Cl. ...................................................... 717/1
(58) Field of Search .................... 395/701, 702, 395/703, 500.34, 500.42, 500.43; 345/967; 717/1, 2, 3, 4; 703/25, 30–35

(56) References Cited

U.S. PATENT DOCUMENTS

| | | | |
|---|---|---|---|
| 5,351,195 A | * 9/1994 | Sherman ..................... | 364/468 |
| 5,689,711 A | * 11/1997 | Bardasz et al. ............. | 395/701 |
| 5,799,193 A | * 8/1998 | Sherman et al. ............ | 395/703 |
| 5,819,270 A | * 10/1998 | Malone et al. ................. | 707/7 |
| 5,826,086 A | * 10/1998 | Arima et al. ................ | 395/701 |
| 5,875,333 A | * 2/1999 | Fish et al. ................... | 395/702 |
| 5,917,730 A | * 6/1999 | Rittie et al. ............ | 395/500.27 |
| 5,930,512 A | * 7/1999 | Boden et al. ................ | 395/710 |
| 5,937,197 A | * 8/1999 | Jury ............................ | 395/712 |
| 5,978,578 A | * 11/1999 | Azarya et al. .............. | 395/701 |

OTHER PUBLICATIONS

Miller et al., "Simulation Modeling within Workflow Technology", Proc. of the 1995 Winter Simulation Conf., ACM, 1995, pp. 612–619.*

Rumsey et al., "Unifying tool, data and process flow management", IEEE, 1992, pp. 500–505.*

Ambriola et al., "Assessing Process–Centered Software Engineering Environments", ACM Transactions on Software Engineering and Methodology, ACM, 1997, pp. 283–328.*

* cited by examiner

Primary Examiner—Kakali Chaki

(57) ABSTRACT

To achieve an integrated and robust system of business process tools that can, through feedback, continually improve its level of efficiency, a novel arrangement has been created with a commonly shared data repository which maintains a formal model of a process under consideration, and a plurality of tools that, through appropriate cooperation between the tools, offer the ability to model an EP process (that is, an existing process or a proposed process), analyze the process, control the process, modify the process, improve the model, and generally result in a more efficient EP process. The set of tools included in the arrangement is not limited although, as a minimum, it is considered necessary to include a modeling tool, a workflow tool, and a code generation tool. More specifically, the workflow tool allows interaction with an EP process to develop information that can be used to enhance the EP process model (in the sense of proposing an improved EP process); the modeling tool allows for modifying the model data; and the code generation tool allows for the provision and delivery of an enhanced code to the EP process which, in turn, allows the workflow tool to effect an improved EP process. The common repository forms a nexus for the two-way communication that exists between the various tools employed in connection with the EP process.

15 Claims, 3 Drawing Sheets

CONTROL OF COMMERCIAL PROCESSES

BACKGROUND OF THE INVENTION

This invention relates to industrial and business processes and, more particularly, to modeling, analyzing and controlling of such processes.

Today's business organizations typically include many processes. Some are simple, some are complex, and some comprise a plurality of sub-processes. To give an example, the work done in a corporate patent department really comprises a collection of processes. Illustratively, one process relates to the receipt of invention ideas from employees, another relates to the creation of a patent application and its filing in the Patent Office, still another relates to the prosecution of the patent application, yet another relates to the harvesting of commercial benefit from the intellectual property represented by the issued patent, etc. Some business processes are carried out by people, some are carried out strictly by computers or other machines, and some are carried out by people interacting with computers. Obviously, the efficiency of processes is extremely important to the overall efficiency of the organization concerned. To assure this efficiency, an entire art has developed that is dedicated to the study, improvement, and real-world implementation of organizational processes.

The most basic tool for studying processes is the modeling tool. It provides a mechanism for capturing, describing, and documenting in some selected language the process under consideration. It may be an existing process or a proposed process (herein collectively referred to as an "EP process"). The selected language typically is one that expresses the model in the form of a set of data structures and associated equations which allow analysis and other activities to take place relative to the EP process.

Once a process is modeled, the next natural step is to study the modeled process in order to determine its characteristics and to derive therefrom some knowledge about the modeled process. Tools that concentrate on the evaluation of static attributes of the modeled process are referred to as "analysis tools". For example, an analysis tool may be used to determine the average length of time that the corporate patent department takes between the receipt of a patentable idea and the filing of a patent application.

Tools that concentrate on the dynamic behavior of the modeled process are referred to as "simulation tools". They perform analysis by simulating the operation of the modeled process. Monte Carlo simulation, for example, provides one approach to simulation, where the behavior of individual elements of the modeled process are considered together with their stochastic characteristics. Another form of simulation is known as Discrete Event simulation. It takes into account the arrival characteristics of events and it reveals whatever bottlenecks exist in the modeled process (e.g., a constricted access to a given set of resources). A discrete event simulation of a corporate patent department, for example, may uncover the likelihood of a bottleneck at the department's printer. Such a bottleneck is likely to result in a queue of print jobs, and the consequent deleterious effect on the department's efficiency measure.

Many businesses employ processes where a computer or other machine actually performs some of the work that constitutes part of the process, and also directs at least some of the workflow of the process. For example, in a corporate patent department a computer system may include software modules that help prepare documents (such as letters to inventors), as well as software modules that trigger reminders to attorneys and their assistants that amendments are due, that management reports need to be created and printed, etc.

Software modules that perform workflow functions (i.e., direct the workflow) are usually referred to as "workflow tools." They typically are derived heuristically for the particular business process that needs to be directed. Indeed, there are a number of commercially available software modules which can be customized by the vendor for various specific business processes. In the current state of the art, the customizing of these tools is not done in conjunction with modeling, simulation, or other automated means. Rather, modifications typically are introduced when a customer requests the programmer to accommodate special needs, and the programmer programs them in. As an aside, a workflow tool can be viewed as a means to supervise processes since it is the tool that provides instructions and/or data to a person or to some automated means to trigger the initiation of some other some task or process.

Still another type of tool that is available in the field of business processes is the "code-generation tool". This tool employs information from the modeling tool to develop software that can be inserted into the EP process computer(s) to thereby implement a process which conforms to the model that is supplied by the modeling tool. This tool is typically used when a new process is being designed and where, therefore, the starting point is the modeling tool (in contrast to situations where the modeling tool attempts to describe an existing process).

Although the above described tools are available in the business processes arts, no system is available that combines a sufficient number of the various tools to create an integrated and robust system that, through feedback, can continually improve its level of efficiency.

SUMMARY OF THE INVENTION

In accordance with the present disclosure, a novel arrangement is created with a commonly shared data repository which maintains a formal model of a process under consideration, and a plurality of tools in the arrangement that, through appropriate cooperation between the tools, offer the ability to model an EP process, analyze the process, control the process, modify the process, improve the model, and generally result in a more efficient EP process. The set of tools included in the arrangement is not limited although, as a minimum, it is considered necessary to include a modeling tool, a workflow tool, and a code generation tool. More specifically, the workflow tool allows interactions with an EP process to develop information that can be used to enhance the EP process model (in the sense of proposing an improved EP process); the modeling tool allows for modifying the model data; and the code generation tool allows for the provision and delivery of an enhanced code to the EP process which, in turn, allows the workflow tool to effect an improved EP process. The common repository forms a nexus for the two-way communication that exists between the various tools employed in connection with the EP process.

DETAILED DESCRIPTION

The discussion below presents an arrangement that integrates a number of business process tools to effectively control an EP process. This control is driven by data created with a modeling tool, and the very same data can be used to drive a code generation tool for affecting the actual EP process. Additional mechanisms are provided to provide feedback to enhance the model and to enhance operation of the EP process. The process of modeling is simplified by a unique graphical language, disclosed below, which permits easy process definition, easy editing, and simple mechanisms for automatic code generation.

Figure 1:
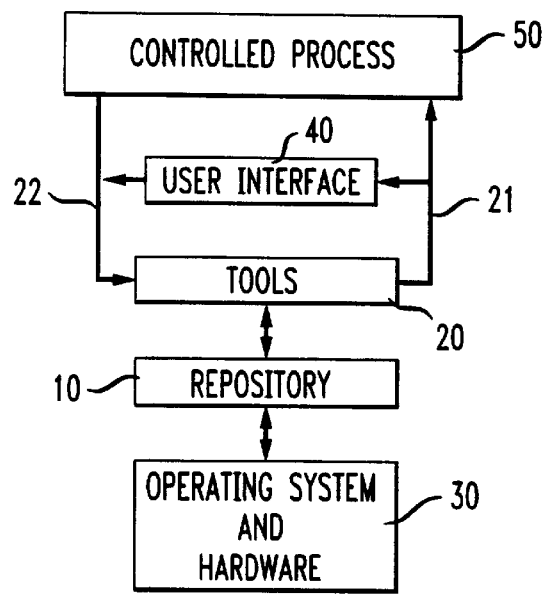
FIG. 1 depicts a general block diagram of an EP process and the controls applied thereto in accordance with the principles disclosed herein.

FIG. 1 presents one view of the disclosed arrangement. It comprises a set of tools 20 which receive input signals 22, interact with a data repository 10, and provide output signals 21. Elements 10, 20 and 40 are supported by an operating system and associated hardware 30. Output signals of the tools are applied, via bus 21, to a user interface module 40 and to the EP process 50. Modules 40 and 50 feed information to tools 10 via bus 22.

Repository 10 includes objects, relationships, and properties. Properties are attributes that can be associated with both objects and relationships. The elements of repository 10 are typically implemented via records, or lines., in tables within repository 10. Examples of objects are processes, activities, applications, files, people, roles, resources, data, data types, etc. Examples of relationships are precedence, containment, control, etc. Examples of properties are name, cost, duration, size, quantity, actions, etc. Properties may be mathematical or statistical expressions, and they may even be based on other properties.

Element 30 can be a conventional PC, or a network of distributed heterogeneous computers. Unlike in prior art arrangements, where a model is fully contained within a single computer file (database), in accordance with the principles disclosed herein a model or a set of models, objects, and their relationships may be distributed across multiple heterogeneous file systems and files.

Tool block 20 which interacts with repository 10 comprises a set of tools which may include a viewing and editing tool, a validation tool, an analysis tool, a simulation tool, a navigation tool, a workflow tool, a software code generation tool, a software reverse engineering tool, etc. The following table presents a brief overview of the function of each tool. It may be noted that each of the tools may be found individually in the art; that is, it may be purchased as a stand-alone tool. It is believed, however, that no single arrangement has heretofore been created that synergistically combines a plurality of these tools to achieve a comprehensive and automatic control over commercial processes.

TABLE 1

| Tool Function | Description | Examples |
| --- | --- | --- |
| Editing | Supports the creation, modification, and deletion of objects, properties, and relationships in the repository. | An activity object is inserted between two other activity objects in a process object model, and its duration property is set to 2 hours. |
| Viewing | Supports the flexible graphical or textual display of objects and their relationships based on properties of these objects and relationships. Display characteristics include: height, width, color, icon/bitmap, textural labels, screen position, etc. | The displayed height of a resource might be proportional to its cost property, its displayed width proportional to its quantity available, and its horizontal offset based on its productivity. |
| Validation | Ensures that repository information is valid, and/or that exceptions are as the user intended. | Ensure that all activities in a process diagram can be reached from the start of the process. |
| Analysis | Generates information based on the static properties of objects. | Sums up the cost of all the activity objects in a process model. |
| Simulation | Supports the generation of information based on statistical and/or time-varying properties of a process model, using techniques such as Monte Carlo simulation and Discrete Event simulation. | Model the cashier operations at a bank, examining tradeoffs between the number of tellers, how quickly they execute transactions, and assumptions of the arrival statistics of customers. |
| Navigation | Under user control, execute a computer-based or real-world activity. | Launch an application by double-clicking on an object at the user's display terminal. |
| Workflow | Under workflow engine (i.e., automated) control, execute a set of computer-based or real-world activities structured as a set of sequential, parallel, iterative, and/or conditional tasks. | Process and route an account application through application, credit verification, and approval activities. |
| Software Code Generation | Convert an abstract repository model of a process and its data model into procedural and/or object-oriented software code. | See FIG. 4. |
| Software Reverse Engineering | Convert procedural and/or object-oriented software code into a set of process and/or data objects. | See FIG. 4. |

Figure 2:
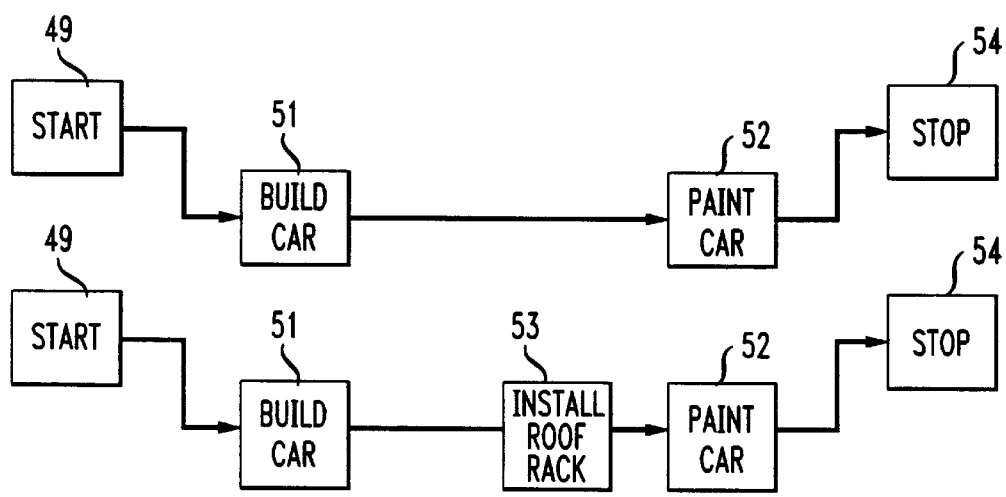
FIG. 2 is a very high-level block diagram of a process depicting inter-related objects.
Figure 3:
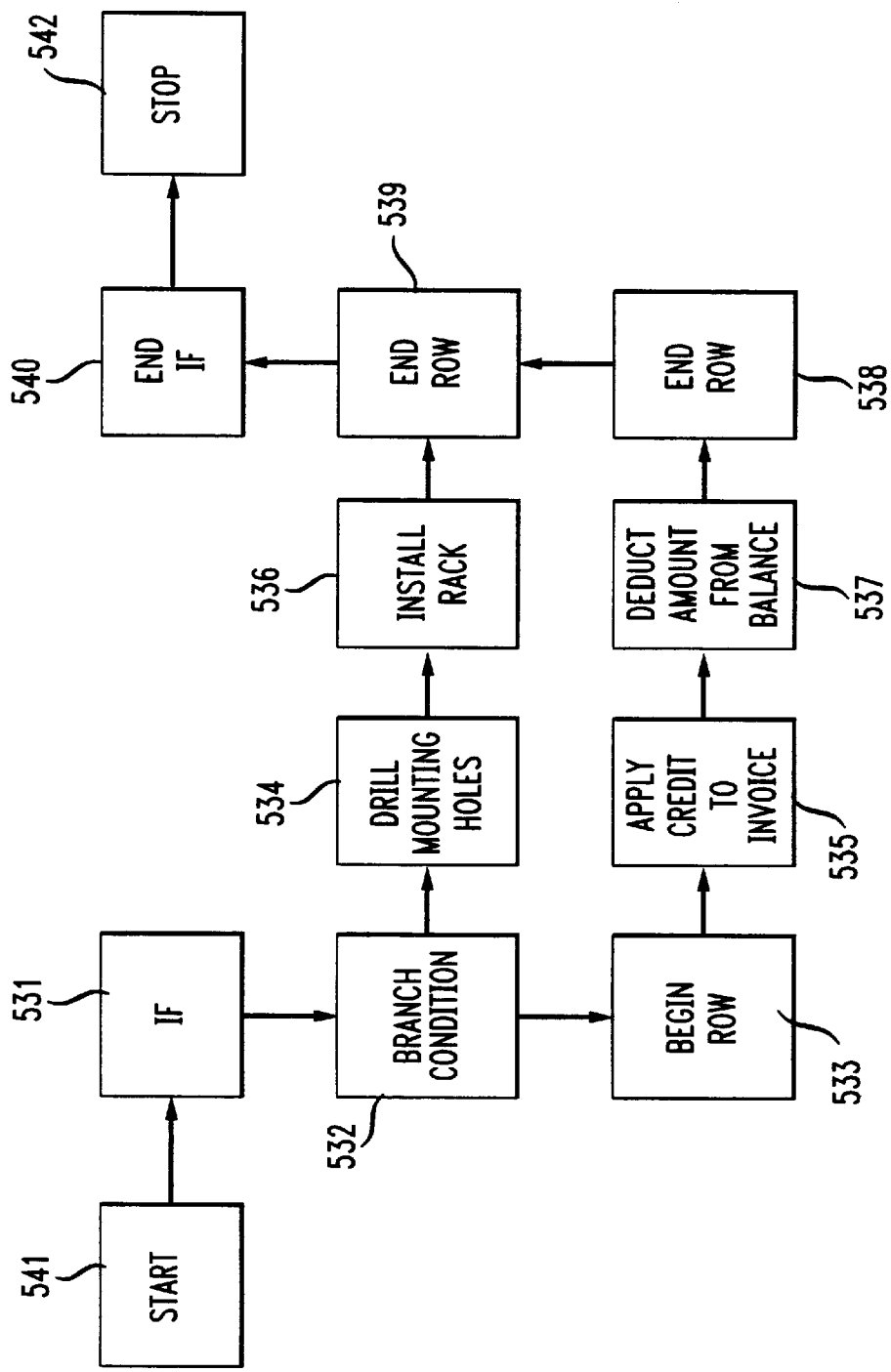
FIG. 3 is a detailed description of one of the processes shown in FIG. 2.

Repository 10 and some of the tools that may be included in the set of block 20 are disclosed below with reference to a simple illustrative process which is depicted in FIGS. 2 and 3. For purposes of discussion it is not important whether the process of FIGS. 2 and 3 are existing processes that need to be controlled, and perhaps also be optimized, or whether the processes of FIGS. 2 and 3 are processes that are being designed.

The FIG. 2 industrial process, as shown in the upper portion of the figure, is the process for building cars and, as depicted, it consists primarily of object 51 which builds the car, and that is connected to object 52 which paints the car. The positioning of objects 51 and 52 and the connection between them indicate that the action of object 51 precedes the action of object 52 in the process, and that object 52 is related to object 51. In accordance with the principles disclosed herein, to enhance the synergistic operation between the various tools every process is defined to include a "START" object and a "STOP" object. In FIG. 2, a "START" object 49 precedes object 51 and "STOP" object 54 succeeds object 52.

As disclosed in more detail below, the editing and viewing tool (which is the modeling tool) is able to append objects and/or insert objects wherever the user desires, subject of course to syntactic constraints which are enforced by the modeling tool. The lower portion of FIG. 2 shows such an insertion of a roof rack installation object 53 that is interposed between objects 51 and 52. Object 53 is in reality a module that represents a process, much like objects 51 and 52 are modules that in their own right represent processes. The process of module 53 is illustrated in FIG. 3. Object 531 is an "IF" control structure. The class property of this object is a "BEGIN" structure. Its type property is "IF". Object 531 is succeeded by object 532.

In describing the FIG. 3 process, the notion of objects being "connected" is used to describe a relationship between objects in the display device in user interface block 40 and in the FIG. 3 drawing. Within a process model, a left-to-right relationship between two objects implies that the completion of the first object's activity triggers the beginning of the second object's activity. For a top-to-bottom relationship, for some structures a precedence is implied—for example, evaluation of a sequence of conditions within an "IF" control structure such as in FIG. 3. However, for other types of control structures—for example, a "PARALLEL BEGIN", wherein multiple sequences of activity are performed simultaneously—such activity precedence is not necessarily implied, but rather the vertical relationship is intended to group activities which should begin at essentially the same time. A bottom-to-top relationship, on the other hand, typically is merely a joinder construct. (The graphical modeling approach disclosed herein is not necessarily intended to represent input-output relationships between objects, unlike other more typical graphical modeling languages.)

Returning to FIG. 3, object 532 is a "CONDITION" object. Its class property is "BEGIN ROW" and its type is "ELSE". The specific condition evaluated by object 532, as controlled by a property specified by the designer, is whether a roof rack has been ordered. An affirmative determination passes control to object 534, while a negative determination passes control to object 533. Thus, if a roof rack was ordered, the process flow will be along the upper horizontal path of FIG. 3; otherwise the process flow will be along the lower horizontal path in FIG. 3.

Object 534 represents the activity of drilling mounting holes for the roof rack (the specific activity performed being, perhaps, one of the properties specified by the designer). Once that has been accomplished, the process flow continues to object 536 wherein the roof rack is installed (again, per the property specified by the designer). Both objects 534 and 536 have the class property "ACTIVITY". Once the roof rack has been installed, the process control continues to object 539. Object 539 has the class property "END ROW" and a type of "END CONDITION". Control passes from object 539 to object 540. Object 540 has the class "END STRUCTURE" and the type "END IF".

When a roof rack has not been ordered, control passes to object 533 whose class property is "BEGIN ROW" and whose type property is "ELSE". Object 533 passes control to object 535 which is an activity where credit is applied to an invoice to account for the fact that the roof rack has not been installed. Control then passes to object 537 which is also an activity. Therein an amount is deducted from the balance due for the manufacture of the car and thereafter control passes to object 538. The class property of object 538 is "END ROW" and the type property of object 538 is "END CONDITION". From object 538, control passes through object 539 to object 540 which, as indicated above, is an "END STRUCTURE" object. As in FIG. 2, FIG. 3 includes a "START" object 541 preceding object 531, and a "STOP" object 542 succeeding object 540.

Repository 10

Illustratively, repository 10 is implemented with three tables: an object/model table, a properties table, and a linkage table. The object/model table might have only two columns: the model ID, and the object ID. Table 2 below illustrates a possible set of records in such a table. It may be noted that a model contains objects and that an object may in turn itself be a model. That is not the case in the simple arrangement of FIG. 2, but it should be kept in mind as a possibility.

TABLE 2

| Model ID | Object ID |
|---|---|
| 53 | 531 |
| 53 | 532 |
| 53 | 533 |
| 53 | 534 |
| 53 | 535 |
| 53 | 536 |
| 53 | 537 |
| 53 | 538 |
| 53 | 539 |
| 53 | 540 |
| 53 | 541 |
| 53 | 542 |

The relationship table identifies the connections between the objects as depicted, for example in Table 3.

TABLE 3

| Relationship Table | | | | |
|---|---|---|---|---|
| Model ID | Relationship ID | From Object ID | To Object ID | Relationship Type |
| 53 | 543 | 541 | 531 | Control Right |
| 53 | 544 | 531 | 532 | Control Down |
| 53 | 545 | 532 | 534 | Control Right |
| 53 | 546 | 534 | 536 | Control Right |
| 53 | 547 | 536 | 539 | Control Right |
| 53 | 548 | 539 | 540 | Control Up |

TABLE 3-continued

Relationship Table

| Model ID | Relationship ID | From Object ID | To Object ID | Relationship Type |
|---|---|---|---|---|
| 53 | 549 | 540 | 542 | Control Right |
| 53 | 550 | 532 | 533 | Control Down |
| 53 | 551 | 533 | 535 | Control Right |
| 53 | 552 | 535 | 537 | Control Right |
| 53 | 553 | 537 | 538 | Control Right |
| 53 | 554 | 538 | 539 | Control Up |

Lastly, the property table, while simple in structure, may be quite large, for it specifies all of the myriad properties that each of the objects possesses. This is shown in Table 4 below is a non-exhaustive manner.

TABLE 4

| Object or Relationship ID | Property Name | Property Index | Property Value |
|---|---|---|---|
| 541 | Type | 0 | Start |
| 541 | Row | 0 | 0 |
| 541 | Column | 0 | 0 |
| 541 | Label | 0 | Start |
| 534 | Type | 0 | Activity |
| 534 | Row | 0 | 1 |
| 534 | Column | 0 | 2 |
| 534 | Label | 0 | Drill mounting holes |
| 534 | Enter | 0 | Acquire (1.0, Drills) |
| 534 | Enter | 1 | Acquire (1.0, Drill Stations) |
| 534 | Enter | 2 | Acquire (2.0, Workers) |
| 534 | Leave | 0 | Release (1.0, Drills) |
| 534 | Leave | 1 | Release (1.0, Drill Stations) |
| 534 | Leave | 2 | Release (2.0, Workers) |
| 534 | Time | 0 | 4.7 minutes |
| 534 | Cost | Car | $12.00 |
| 534 | Cost | Truck | $16.00 |

Repository 10 also can include a resource object, representing resources available to do the real-world process (which typically includes properties such as quantity specification, as well as a cost measure associated with using the resources). An activity object can also have a role property: information concerning the process structure, resources and type of resource attributes, and roles. The roles information specifies which resources perform particular functions of the real-world process. An activity can include role property which specifies who or what does the work, e.g., Role (0)="Executive Secretary".

The Modeling Tool

The modeling tool, which is the editing and viewing tool, needs to support additions, deletions and modifications to a model's objects, relationships, and properties, as well as provide a means for displaying information to the user/designer at user interface 40. One approach for creating such a modeling tool is to employ visual interface techniques not unlike those used, for example, in the Microsoft Visual Basic language. Indeed, the editing tool can be created via Visual Basic programming. For example, in one implementation, the editing comprises a Visual Basic window that includes a "parent" frame, and a "child" Multiple Document Interface (MDI) frame for each model that is currently open. The parent contains a menu, and by clicking on a menu item, such as "insert", a drop-down menu appears and displays the various objects that are known and available to be inserted into the open MDI frame. These objects are taken from the set of objects that are predefined by the system designer, but capabilities can be included to allow users to define objects and to include them in the set of objects displayed when the "insert" menu item is selected. By selecting one of the objects, an instantiation of the object is made to appear on the active MDI frame, not unlike the creation of a control on a Visual Basic application frame (i.e., "form") when a control is selected from the toolbox and then painted in the application frame.

Another menu item on the parent window may be, for example, an "edit relationships" item. By clicking on that item, the ability to create relationships in the active MDI frame is enabled. Thereafter, by clicking on one of the displayed objects in the MDI frame and thereafter by clicking on another object in the MDI frame, a relationship between the two objects is formed and appropriately displayed on the child window. This approach may be used to both create relationships as well as to delete relationships. The distinction hinges on the existence of the relationship or its absence.

As indicated above, objects in repository 10 have properties and relationships and, moreover, relationships have properties as well. Accordingly, it is necessary for the viewing/editing tool to include a capability for showing and for modifying such properties. Thus, in accordance with my illustrative embodiment, clicking on a displayed relationship opens a window that displays the relationship's properties (not unlike the manner by which Microsoft's Access operates on relationship). Similarly, clicking on an object (e.g., mouse's right button) allows the display of the object's properties and modification of such properties.

In what might be termed an enhancement to Visual Basic, my illustrative embodiment employs a spreadsheet custom control to display all objects and their properties in a concentrated manner. In such a spreadsheet, control objects are presented in the rows and properties in the columns. This allows a user to view the entire set of properties for all of the objects in a single glance. Moreover, the spreadsheet control facilitates the process of editing properties on a global basis.

Thus, object insertions are performed via "push-buttons", drop-down menus, keyboard operations, or drag and drop operations from an existing model. Deletions are performed by selection of the object(s) to be deleted, followed by deletion via either a push-button, drop-down menu, or keyboard operation. Modifications are performed by either object-handle dragging, pop-up or pull-down menu, or editing properties which are relevant to the view of the object.

Relationship insertions are performed via clicking on a "from" object, and the shift-clicking on one or more "to" objects. Relationship deletions are performed via either selection followed by deletion, or by toggling an existing relationship by clicking and shift-clicking as per an insertion. Relationship modifications are performed primarily by editing properties which are relevant to the relationship.

Property insertions, deletions, and modifications are normally made by editing a tabular list of properties (by object or relationship) for either the selected object or relationship or for multiple objects and relationships. Properties can also be added to an object by dropping one object onto another, in which case the object which is dropped upon picks up any new properties of the object which is dropped, keeps its old properties where there is no conflict, or has the user confirm and select property values where there is a conflict.

Implementation of objects is normally via PictureBox controls, and implementation of lines is normally via graphics methods. Consequently, the Visual Basic click, double-click, dragover, dragdrop, keypress, and related event procedures are used to implement the model editing capabilities addressed above.

The modeling tool advantageously also provides for flexible visualization of a collection of models. These models may be interrelated, e.g., one model may represent the decomposition of an object in the second model. Each model is given its own window, which is displayed on a graphical display device. The model window provides the ability to view data on the model's objects, relationships, and properties in a variety of ways.

In its implementation, the modeling tool is driven by a set of options to flexibly display objects in a model based on expressions involving their properties. The display of each object in the model window has, illustratively, the following parameters: Height, Width, Color, Picture, Vertical Position, Horizontal Position, and Label Text. The values of the above parameters can be set globally in most instances (e.g., the color of each object is blue and the picture to be shown for each object is "C:\pictures\icons\sphere.ico") but more typically is based on expressions using object properties. For example, height could be set to be "100 * Cost (Wages)", and the Picture could be based on "Icon(0)". In addition, there may be global parameters which affect the display of all objects within a model window: Horizontal Scale, Vertical Scale, Horizontal Offset, Vertical Offset, Background Image, Background Color, Window, Height, and Window Width.

The aggregate option settings for model display are referred to as a style. A special type of object, called a "Style" object, when dropped onto a model will immediately cause redrawing of the model with the parameters set according to the object. For example, one style object might have a Color of "blue" and a Picture of "No picture", whereas a different style object might have a Color of "green" and a Picture of "Icon(0)".

It should be understood that the above description, which is couched in terms of Visual Basic operations, is reflective merely of the user interface. In connection with the underlying purpose and functionality of the modeling tool, there is obviously an associated action that is taken vis-à-vis the information stored in the common repository. For example, the process of selecting and inserting into the MDI frame a new object creates an instantiation of the object in the window, as stated above, and also creates one or more entries in some tables that are maintained in the common repository. Similarly, an action that modifies properties by showing those properties in the MDI frame and allowing the displayed properties to be modified has an associated activity for modifying the values of the information in various cells in the tables maintained in the repository.

It may be noted that, when an object is chosen to be created and inserted in the MDI frame, some choices need to be made relative to where in the MDI frame the object is placed. As a general rule, an object is placed at any available spot in the child window. Alternatively, it can be placed in a very specific location which may have some meaning to the overall model displayed. This is particularly true when the displayed model is a process. In process models, objects have rigorously constrained inputs and outputs and the relationships between different objects in a process model are also rigorously controlled. Because of that, it is convenient to arrange it so that when an object is inserted in a particular spot, relationships are automatically established between the inserted object and the neighboring objects, if appropriate, in conformance with the constraints of the related objects. To effect that, a subroutine simply compares the insertion of the object, determines the identity of the object immediately to its left (the process that immediately precedes the inserted object), determines what, if any, are the outputs of that preceding object, and based on that determination assesses whether it is permissible to insert the object at hand and, if so, what relationships need to be established between the inserted object and the one preceding it. Once those determinations are made, the object is inserted into the MDI frame and the corresponding entries are made in the repository tables. Actually, the above suggests that the point of insertion in the case of an object being "dropped", expectedly, is the point where the object is dropped. In such a circumstance, the newly inserted object is made to relate to an object immediately to the left of the point of insertion, and if appropriate, the newly inserted object is made to relate to the two objects that were previously related to each other, where that relationship was broken off by virtue of the insertion of the new object.

Validation Tool

Validation is performed in two ways. Validation by design prevents invalid models from being created.—e.g., drag-and-drop operations to insert an object in an existing process model will prevent any operations that do not result in the process model being valid, with a single start point, end point, and complete connectivity and reachability between the objects and control structures in the model.

Validation after editing traverses the model, examining objects, relationships, and properties, and reports on any potential problems or overly complex structures. That is, in a state transition model, validation ensures that every state has a sum of fan-out probabilities totaling 1.0. It also reports on nodes with only one entry and exit, due to the potential for model simplification.

Analysis Tool

A variety of analysis methods may be used to generate calculated results based on the structure, relationships, and properties of objects in the repository. For example, one analysis tool determines the critical path through a process model based on parallel branch control structures and the Time property. Another tool determines the total rolled up sum of a user-selected property (such as Cost) of the decompositions of an object, by performing a depth-first search on the decomposition tree and summing the property up to the highest level.

Simulation Tools

1. Monte Carlo Simulation Tool

The Monte Carlo simulation tool is one of the simulation tools that may be employed in the arrangement of this invention. This tool can be constructed simply with a piece of software that specifies a number of simulations that are to be performed. Each simulation can be performed with or without a predefined set of input parameters. In connection with the analysis, the user may select any object or any property of the object to be reported back to the user. The user can also select calculations to be performed on such reported information. The actual simulation is performed by visiting the first object in the process, calculating the various parameters that are altered if any, and calculating output results of the object. Those results are effectively the inputs to subsequent objects in the process. Having completed the analysis of the first object, the next object in the process is addressed in a similar manner. When an object is encountered that includes one of the pre-specified properties—for example, one that the user expressed an interest in—the value of such a property is set aside for further treatment, such as aggregation via operators such as "sum", "product", "min", "max", or "count", and reporting to the user. Determination of the "next" object is normally straightforward, and is the object succeeding the current one. However, on occasion, more than one succeeding object may exist—for example, at points of parallel branches, conditional branches, or iterative loops. In such instances, determination of the "next" object to process is based on properties such as the branch probability property of objects at branch points—for example, a condition object—or a determination of whether a loop structure should be iterated again. Thereafter, a next simulation trial of the process is initiated and the process simulation is repeated. This is repeated as many times as specified by the user with the end result being that all of the information set aside for reporting to the user is then available to be reported to the user as requested.

2. Discrete Event Simulation Tool

The discrete event simulation tool can be said to include a simulation engine that interacts with four different modules: the discrete event arrivals module, the resources module, the simulated processes module, and the results acquisition module. The discrete event arrivals module comprises a model of the discrete events that are to be applied to the simulated process together with software for activating the events. The module describes the parameters associated with the event arrivals module, such as statistical inter-arrival times, time of first arrival, time of last arrival, the quantity of the arriving items, location, etc. The simulation engine primarily comprises an event scheduler, that is applied to the discrete event arrivals module which interacts with the model of that module to create the arriving events, and an event processor. In the course of applying events to the process to be simulated, resources are needed to be acquired, utilize, released, and/or transformed. It is often advantageous to represent the availability of resources by means of the resource module which is representative of the real-life situation where resources are limited. The simulation engine portion which may be termed the event processor is applied to the resource module to ascertain the available resources. The availability of these resources may be a function of time, statistical variables, and previous processing simulated for the process to be simulated. Applying the arriving entities and the available resources to the process to be simulated, the actual simulation occurs. In the course of such simulating, an entity arrives at an object in the process. Upon arrival, resources are acquired. Thereafter, the process called for by the object is carried out for some duration of time, and, upon leaving the object, resources are relinquished as appropriate. Thereafter the entity moves to another location, that is, to the next object in accordance with the module of the process to be simulated. The results of the simulation at whatever observation points specified by the user (outputs of user-specified objects) are accumulated in the results acquisition module.

The simulation engine can be implemented in a conventional manner.

As an aside, the above describes the notion of obtaining resources and relinquishing resources. The operation of the event processor on the resource module can be structured to account not only for the presence and availability of resources and the quantity of the available resources, but can also be enhanced to allow for different states of the resources. For example, a milling machine, as a resource, can be in an idle state, a broken state, a working state, a fully loaded state, etc. It is also possible for processes to be included which modify the states of the resources. This can be achieved, for example, with an object that acquires a resource having one state, and relinquishes a similar resource with a different state.

Navigation Tool

The navigation drives the execution of computer-based or real-world activities. A user can navigate a process or other model by traversing left, right, up, down, or into a decomposition. When an area of the model to be executed is reached, the user can then double-click on the object to cause it to be executed. Depending on the object and its properties, and the current execution mode of the environment, action will be taken, to, e.g., launch a specific software application, send a message to a running application or machine, or display the status of a machine or other real-world entity.

Implementation of navigation actions is performed in five major steps:

1. Determine the object (activity, application, file) which has just been selected for navigation.
2. Determine the mode of execution of the environment (design mode normally supports modification to objects, relationships and properties; test and execution modes normally do not).
3. Look in the repository for execution data on the object in a given mode, e.g., the name of the application to launch. Modes are important because a telemarketing scripting application, for example, may have an activity that will execute differently in different modes. In design mode, when executed, it will record a sound file and support wave editing of it. In test mode, it may playback the sound on the user's computer. In execution mode, it may broadcast the message over all the company's loudspeakers in all buildings.
4. Execute the task—for example, in the Windows '95 environment, call the "Shell" command of the MS Windows Application Programming Interface. Other execution mechanisms include MS Dynamic Data Exchange and MS OLE objects.
5. Wait for completion of the task or not before resuming operation based on an object property.

Workflow Tool

Workflow is similar to Navigation, with the exception that an entire process is executed, not just a single activity. A process is executed in one of three ways:

1. A user causes a process to be executed either by double-clicking on the start icon of a process, or choosing "Start Workflow Transaction" from a pull-down menu.
2. A different (or at least, different transaction instance of a) process which is currently being executed invokes the start of the process.
3. A scheduler (operating system) or event processor starts the process.

Once a process is started, activities in the process are visited in turn, and executed using the same logic and implementation mechanisms as for Navigation. The following points apply particularly to Workflow, however.

1. One or more parallel branches of the process model may be taken based on data or conditions of the process
2. Result codes may be returned from execution and treated as above 3. If an activity is manual, the Role property is examined to determine the Role which is responsible for executing the activity, and the specific activity for the specific transaction is loaded onto the Role's To Do List. An individual who has that role (the individual may have more than one role simultaneously) then has visibility into the transaction and may choose to execute part or all of the activity. The user then can report back a type of incomplete or completion status for the activity, e.g., "waiting for parts," or "approved," as well as metrics for the activity (time, cost, yield) and update data applying to the transaction. Based on the completion status and/or data in the system, the transaction then moves to the next activity.

Software Code Generation Tools

Code generation is performed by recursively traversing process objects, data objects, and data type objects to generate code. Code can be generated for a variety of target languages, based on the objects and compilation tools present in the environment. The same "universal" object model may be used to generate code for different target languages—that is, the same control structure may translate into a "switch" statement in C, a "Select Case" statement in Basic, a "Case" statement in Pascal. Examples of code which can be generated, and the types of objects which are used as input to the code generation process are:

| | |
|---|---|
| Process, Data Type, and Data Objects | Used to generate sequential or parallel Procedural Languages, e.g., C, BASIC, PASCAL, or even DOS, JCL, etc. Process objects are recursively traversed to generate procedures, data type objects are recursively translated to generate C structures, BASIC types, etc. Data objects are recursively translated to generate data declaration statements. |
| Data Type Objects, Data Objects | Used to generate relational Database Management System Data Definition Language, e.g., SQL (Structured Query Language) DDL. Data Type Objects are translated into relations (i.e., tables). Data Objects are translated into field names (i.e., column headers). Properties of data objects are used to customize the specific data declaration. For example, the DataType property can specify an integer, float, character, constant, or boolean data element. The Value property can specify the initial value. The Comment property can specify a human-readable (and machine-ignored) comment about the data element. |
| Class, Process, Data Type, and Data Objects | Used to generate Object-Oriented Languages, e.g., C++. Class Objects are containers for Process, Data Type and Data Objects and are used to define classes. Process Objects are recursively translated to generate methods. Data Objects are translated to generate public, private, or friend data definitions. |
| Project Models | Used to generate a variety of computer- "readable" formats, e.g., HTML (HyperText Markup Language). Graphical objects and their properties are used for page layout. A translator then generates a (text-based) specification based on object properties. |

The means by which this software code generation is done varies slightly from target language to target language. To translate a process model object to a procedure (or method), the translation engine recursively visits the entire process model and its decompositions, with the following software generated.

| Graphical Object Name | Generated Code |
|---|---|
| Activity, e.g., assignment, go to | Statement. The Operand property array is used to populate the statement appropriately. For example, in an assignment statement, Operand(0) is the Left Hand Side, Operand(1) is the Right Hand Side. For languages supporting multiple assignment, the Operand array is processed in order. |
| If, While, Condition, Do While, Do Until, Case, Switch, Select Case, etc. Control Structure | Corresponding procedural language statement, e.g., If - Then - Else, Select Case - Case - End Case. Again, the Operand property array is used to generate the text statement. E.g., in an If statement, Operand(0) is used as the condition. For a Select Case structure, multiple operands can be used for the criteria for each Case block. |
| Do All, Do Some Parallel Control Structure, with Merge, Sync, or Combine at end of structure | For a serial procedural target language, each row of the structure is visited in turn, with serial (not parallel) code generated. For a parallel procedural target language, parallel code is generated. |
| Data Type | Data Types are recursively visited to generate type or structure or relation declarations. |
| Data | A data definition is generated for a built-in or user-defined type. Properties such as Comment, Initial, DataType, Parameters (e.g., "Static", "Register") are used to round out the definition. |

Figure 4:
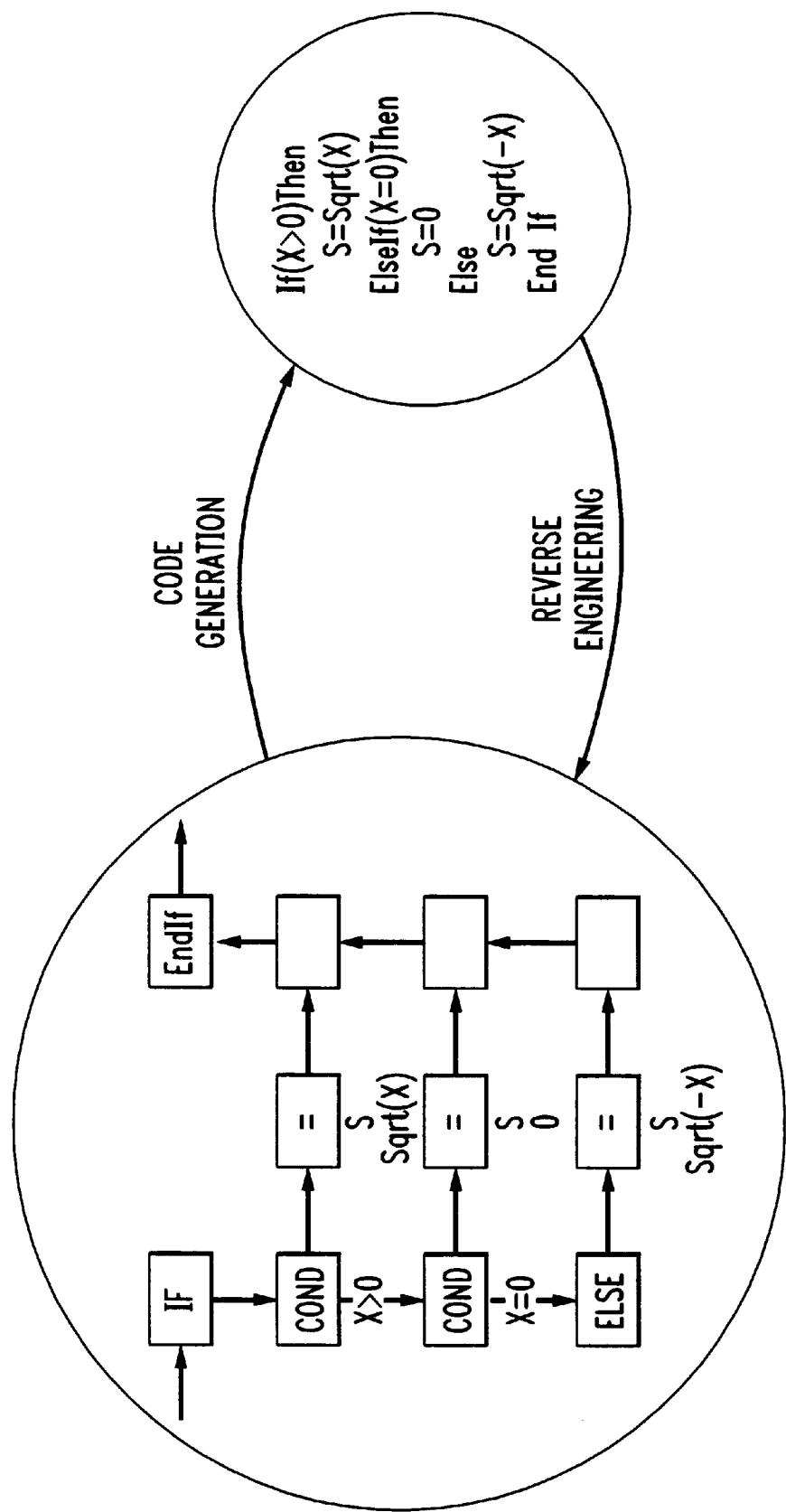
FIG. 4 presents a diagram of the software code generation and reverse engineering process.

FIG. 4 presents an example of code generated for an "IF" control structure that is similar to the structure of FIG. 3. The correspondence between the structure and the code is immediately apparent, showing the power of code generation tools with a modeling schema as disclosed above.

Software Reverse Engineering Tools

Reverse engineering, by which in this context we mean the generation of graphical process model objects, data objects, data type objects, and/or class objects from a textual language such as C, is performed by reversing the mappings described above under software code generation. An illustrative means of performing reverse engineering for a procedural language, e.g., converting procedures or methods to process objects, is:

1. A lexical analyzer which converts a stream of individual character bytes into meaningful tokens, such as variable names, statement types, etc.
2. A parser which converts a stream of tokens into a parse tree
3. A translation engine which then converts the parse tree into a process model and possibly its decompositions by navigating the tree and generating process models.

One interesting aspect of the FIG. 1 arrangement is that it can be usefully employed to design proposed systems, to test both proposed and existing systems, and to dynamically control such systems. The various tools employed all interact with a common repository of data and thereby interact with each other in a seamless fashion. This allows, for example, for use of a model of an actual process to be used to create code that actually contributes to performing of the work intended for the EP industrial or commercial process (e.g., included in what might be termed a "work process manager" tool and in workflow and navigation tools); it allows for use of the analysis tool that assesses the performance of the process; it allows for use of modeling, simulation, workflow and navigation tools to propose and test changes to the EP process that would enhance the process, it allows for corresponding modification of the EP model, and for continuing improvement in the fidelity with which the model represents the actual system.

I claim:

1. An arrangement comprising:

a repository containing an EP model, and a set of tools that interact with the EP model, which set comprises a modeling tool, a workflow tool arranged to control operation of a physical tool, and a code generation tool for generating code applied to said workflow tool for controlling operation of said physical system.

2. The arrangement of claim 1 where the set includes a simulation tool.

3. The arrangement of claim 1 where the set includes a navigation tool.

4. The arrangement of claim 1 where the set includes a validation tool.

5. The arrangement of claim 1 where the set includes an analysis tool.

6. The arrangement of claim 1 where the set includes a software reverse engineering tool.

7. The arrangement of claim 1 where the modeling tool includes attributes that allow automated generation of code from the modeling tool.

8. The arrangement of claim 1 where the modeling tool includes attributes that allow driving the workflow tool.

9. An arrangement including a modeling tool driving a workflow system which interacts with an EP process by driving operation of the EP process and by developing information from the interaction with the EP process that suggests a modification to the EP process developed by the modeling tool.

10. An arrangement according to claim 9 further comprising an analysis tool to evaluate with the information developed by the workflow tool, to form said suggestions to modify the EP process.

11. The arrangement of claim 10 further comprising a code generation tool to effect said suggestions to modify the EP process.

12. The arrangement of claim 9 further comprising means for automatic modification of the model employed by the modeling tool.

13. An arrangement comprising:

a workflow system that drives a real-world process where the process is driven, at least in part, with software code received from a code generator tool which was driven by a modeling tool that includes attributes for driving the workflow system.

14. The arrangement of claim 1 where the repository is distributed among a plurality of geographically dispersed computers.

15. The arrangement of claim 1 where said set of tools take information from said repository, and deposit information into said repository with a predefined format.

* * * * *